United States Patent [19]
Price et al.

[11] Patent Number: 5,924,207
[45] Date of Patent: Jul. 20, 1999

[54] GUIDE WINDOW FOR SAW SHOE

[75] Inventors: Scott D. Price, Singapore, Singapore; Robert I. Somers, Reisterstown, Md.

[73] Assignee: Black & Decker, Inc., Newark, Del.

[21] Appl. No.: 08/852,254

[22] Filed: May 6, 1997

Related U.S. Application Data

[60] Provisional application No. 60/037,311, Feb. 5, 1997.

[51] Int. Cl.[6] .............................. B23D 47/02; B27B 9/04
[52] U.S. Cl. ................................. 30/376; 30/388; 30/391
[58] Field of Search ............................ 30/374, 376, 388, 30/390, 391, 392; 83/520

[56] References Cited

U.S. PATENT DOCUMENTS

| | | |
|---|---|---|
| 2,806,492 | 9/1957 | Becker . |
| 3,242,953 | 3/1966 | McCarty et al. . |
| 3,339,598 | 9/1967 | Frostad ..................................... 30/376 |
| 3,504,716 | 4/1970 | Bush et al. ............................ 30/392 X |
| 4,450,627 | 5/1984 | Morimoto . |
| 4,494,434 | 1/1985 | Young . |
| 4,555,849 | 12/1985 | Ando et al. ............................... 30/388 |
| 4,589,208 | 5/1986 | Iwasaki et al. ....................... 30/391 X |
| 4,856,394 | 8/1989 | Clowers ................................ 30/391 X |
| 5,062,460 | 11/1991 | DeLine . |
| 5,279,037 | 1/1994 | Leatherman . |
| 5,285,708 | 2/1994 | Bosten et al. . |
| 5,375,495 | 12/1994 | Bosten et al. . |
| 5,461,790 | 10/1995 | Olstowski . |
| 5,561,907 | 10/1996 | Campbell et al. .................... 30/388 X |
| 5,570,511 | 11/1996 | Reich et al. .......................... 30/390 X |

*Primary Examiner*—Eugenia A. Jones
*Attorney, Agent, or Firm*—Shook, Hardy & Bacon L.L.P.

[57] ABSTRACT

A saw shoe is provided for use on a hand-held circular saw which has a saw blade for cutting a workpiece. The saw blade has an identified direction of travel. The shoe rides upon a top surface of the workpiece. The shoe has a base with an aperture extending therethrough which accommodates the saw blade. The base further has a top surface and a generally planar bottom surface. The base has a first edge which is located forwardly of the saw blade with respect to the direction of travel of the saw blade, and a second edge opposite said first edge. A pair of opposing side edges extend between the first and second edges. The base further has an opening extending therethrough from the top surface of the base to the bottom surface. The opening is located adjacent to the first edge and at least a portion of the opening is in co-linear relation to the direction of travel of the saw blade so that the user of the saw can view the workpiece through the opening.

11 Claims, 3 Drawing Sheets

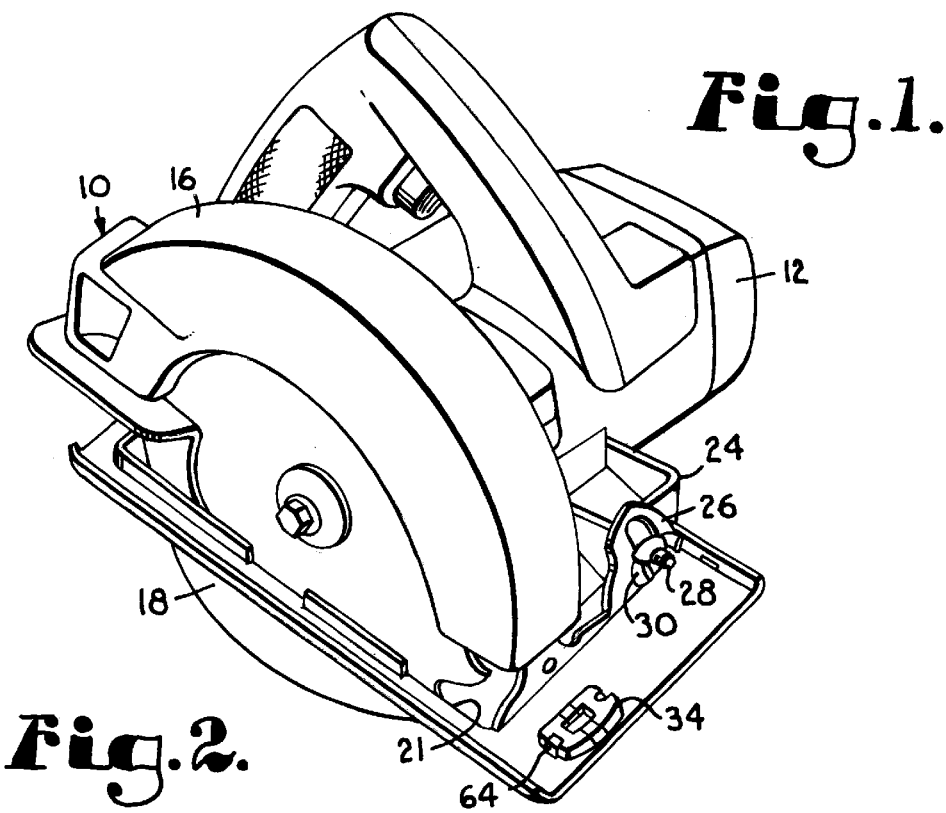
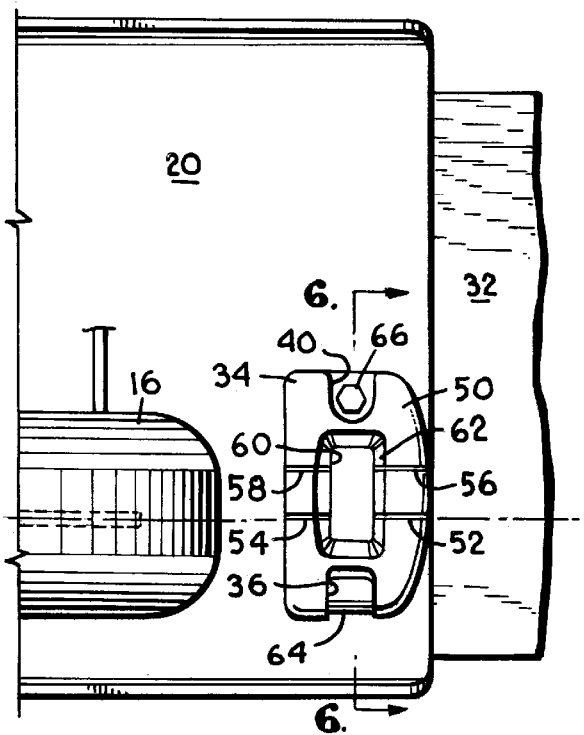
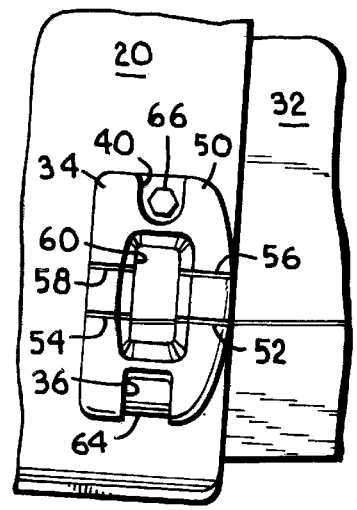

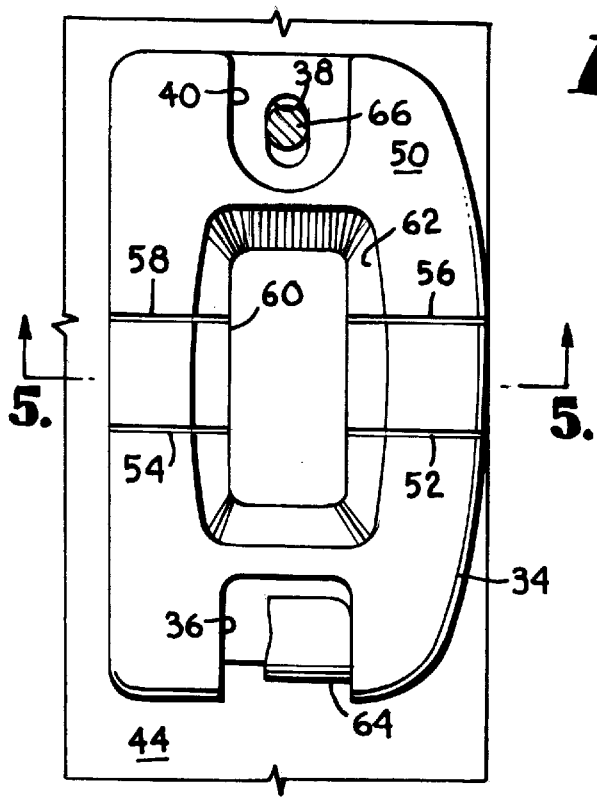
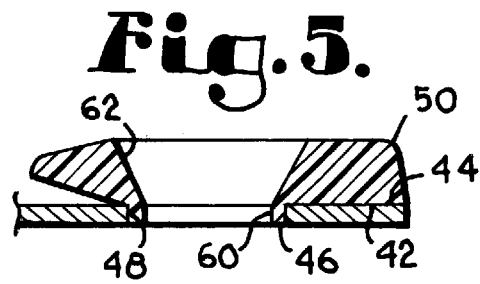
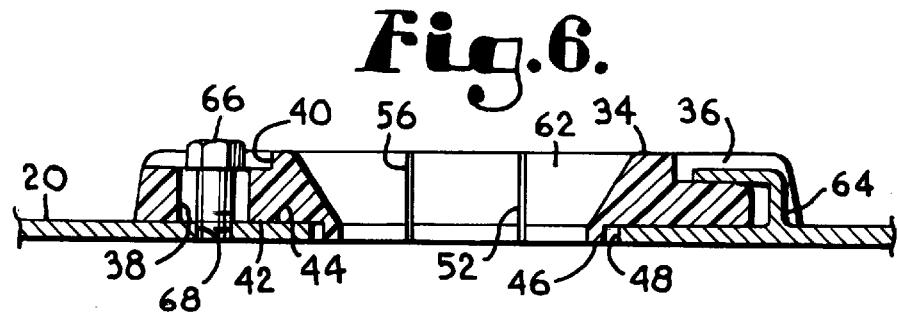

GUIDE WINDOW FOR SAW SHOE

This application claims the benefit of U.S. Provisional Application No. 60/037,311, filed Feb. 5, 1997.

BACKGROUND OF THE INVENTION

This invention relates to a circular saw having a viewing window on the shoe thereof.

One of the problems associated with the use of a hand-held circular saw is properly aligning the saw so that the desired cut is achieved. Typically, a user will draw a line on the material to be cut. This line represents the location of the desired cut. The problem arises when the user of the hand-held circular saw attempts to align the blade with the line on the material. The problem continues as the user attempts to keep the blade tracking on the desired cut line.

To assist in the alignment, circular saws are typically provided with a guide slot. The guide slot is usually located on the planar cutting base, or shoe, of the saw, and is positioned in front of, and in line with, the circular saw blade. The user then positions the saw so that the line on the material appears in the guide slot. While the provision of such a guide slot does aid the user in proper saw alignment, problems still exist. Because the guide slot is located in front of the blade the guide slot can be positioned on the cut line while the blade is not. If the user begins to cut the material with the saw in this orientation, it is often difficult to correct the alignment problem.

Therefore, a window assembly is needed that will allow a user to ensure that the blade of the saw is in alignment with the desired cut-line. Further, a window assembly is needed that will allow a user to continuously monitor the alignment of the saw blade relative to the desired cut-line.

SUMMARY OF THE INVENTION

Accordingly, it is an object of the present invention to provide a window assembly on the shoe of a circular saw, positioned so as to allow alignment of the saw blade with a reference line.

According to the present invention, the foregoing and other objects are obtained by a guide window assembly for use on a hand-held circular saw. The guide window is located on the shoe of the saw and is located forwardly of the saw blade. The guide window has a central opening extending therethrough and has at least one set of guide marks thereon. The guide window has a relief slot and a slotted throughhole for coupling the guide window with the shoe. The relief slot and the slotted throughhole cooperate to allow the location of the guide window to be adjusted relative to the shoe.

BRIEF DESCRIPTION OF THE DRAWINGS

In the accompanying drawings which form a part of this specification and which are to be read in conjunction therewith and in which like reference numerals are used to indicate like parts in the various views:

FIG. 1 is a perspective view of a circular saw embodying the guide window pointer of the present invention FIG. 2 is an enlarged partial top plan view of the invention shown in FIG. 1;

FIG. 3 is an enlarged partial top plan view similar to FIG. 2, shown with the saw in misalignment with the desired cut-line of the work piece;

FIG. 4 is an enlarged partial top plan view similar to FIG. 2, with parts being broken away to show particular details of construction;

FIG. 5 is a cross-sectional view taken along line 5—5 of FIG. 4; and

FIG. 6 is a across-sectional view taken along line 6—6 of FIG. 2;

DETAILED DESCRIPTION OF THE PREFERRED EMBODIMENTS

Figure 7:
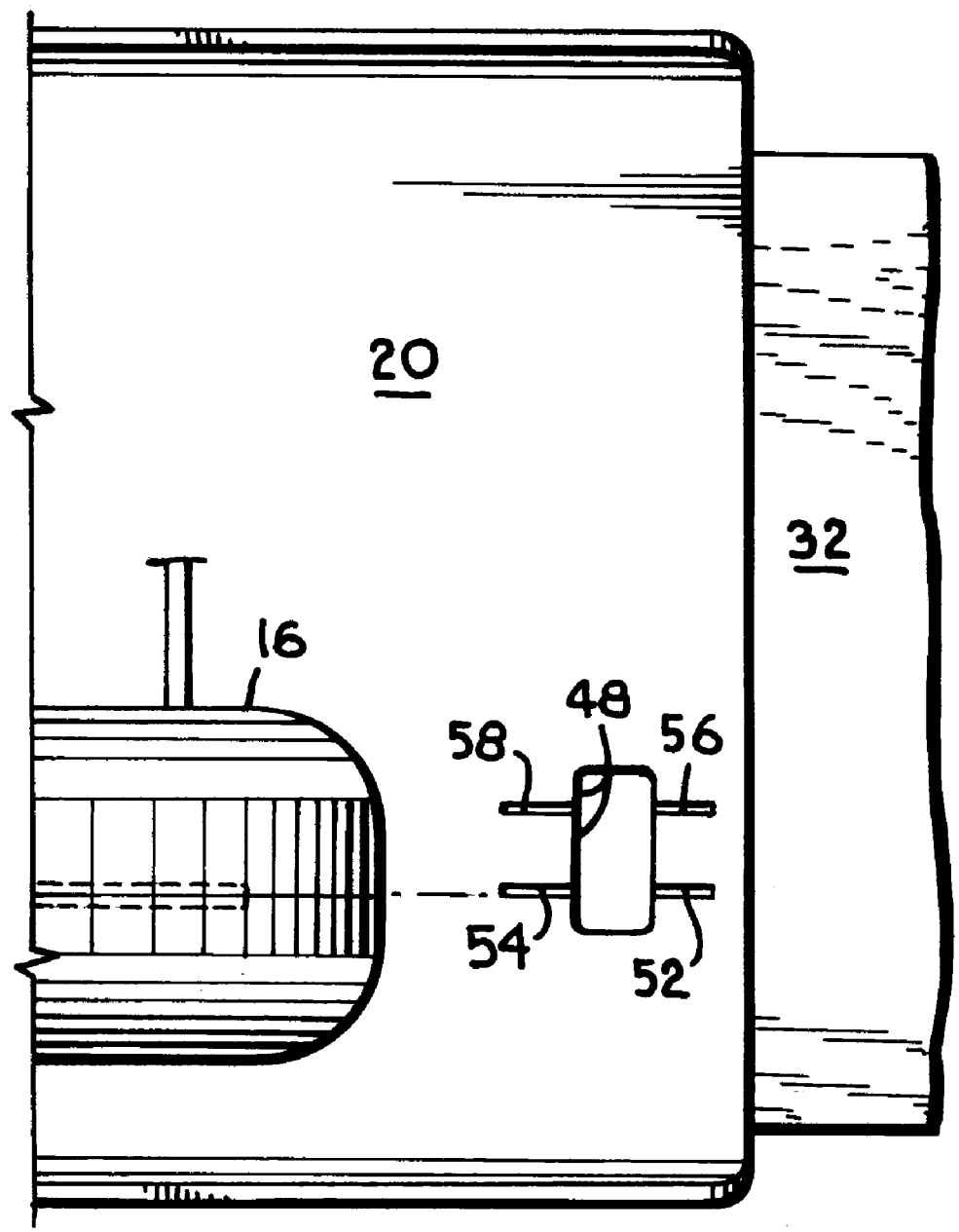
FIG. 7 is an enlarged partial top plan view of an alternative embodiment of the present invention utilizing the guide marks directly on the saw shoe.

Referring to the drawings in greater detail, and initially to FIG. 1, a power circular saw designated generally by numeral 10 is shown. Saw 10 has a motor 12 which is operably attached to a circular saw blade 14. Power is supplied to motor 12 via an electrical power cord (not shown). Saw blade 14 is surrounded about its upper perimeter by an upper saw guard 16 which is fixedly secured to motor 12. The lower portion of saw blade 14 is surrounded by a lower saw guard 18. Saw 10 is further equipped with a planar saw shoe 20. Saw shoe 20 defines an opening 21 through which saw blade 14 can extend. Protruding upwardly from shoe 20 is an angle bracket 24 with a radiused slot 26 cut therethrough. Protruding through slot 26 is a fixed bolt 28. Threaded onto bolt 28 is a wing nut 30.

Lower saw guard 18 exposes the lower portion of blade 14 in a manner that is well known in the art. More specifically, the front edge of lower guard 18 engages the leading edge of a work piece 32. As the saw passes into work piece 32, lower guard 18 is rotated generally upwardly to expose the lower portion of the blade. Guard 18 is spring-loaded so that when saw 10 is disengaged from work piece 32, lower guard 18 returns to its blade covering position.

Attached to shoe 20 is a guide window pointer 34 which decreases alignment problems experienced with the saw, as is more fully set out below. Guide window 34 has formed therein a relief slot 36 that is generally rectangular and that is used to secure guide window 34 in a longitudinal direction on shoe 20. As best seen in FIGS. 4 and 6, guide window 34 has a slotted throughhole 38 formed therethrough that is located on the opposite side of guide window 34 from relief slot 36. As best seen in FIG. 6, slotted throughhole 38 is surrounded by a relief inset 40. Slotted through hole 38 and relief slot 36 are used to attach guide window 34 to shoe 20 as is more fully described below.

Guide window 34 has a first bottom surface 42 which abuts against a top planar surface 44 of shoe 20, as best seen in FIGS. 5 and 6. Further, guide window 34 has a second bottom surface 46 which protrudes below first bottom surface 42 to fit within a shoe opening 48.

Guide window 34 has a top surface 50 on which is marked a 0° leading edge mark 52 and a 0° trailing edge mark 54. Located a predetermined distance away from marks 52 and 54 is a 45° leading edge mark 56 and a 45° trailing edge mark 58. Marks 56 and 58 are oriented in parallel, spaced relation to marks 52 and 54. Guide window 34 further has a central opening 60 disposed therethrough. Opening 60 extends entirely through guide window 34. In an alternative embodiment, opening 60 can be covered with a piece of transparent material (not shown), such as plexiglass. Transitioning from top surface 50 to central opening 60 is a tapered perimeter surface 62. Marks 52, 54, 56 and 58 continue from top surface 50 onto tapered perimeter surface 62 and terminate at central opening 60.

Guide window 34 is attached to shoe 20 by placing second bottom surface 46 through shoe opening 48. As best seen in FIGS. 4 and 6, relief slot 36 accommodates an angle bracket 64 which is formed integrally with or is attached to shoe 20 with any suitable attaching means, such as by welding or by an adhesive. Angle bracket 64 and relief slot 36 allow guide window 34 to be adjusted axially along relief slot 36, but prevent guide window 34 from movement in a direction along marks 52 and 54. With guide window 34 in this position, a bolt 66 is place through elongated slotted throughhole 38 and threaded into a tapped hole 68 in shoe 20, as best seen in FIG. 6. Thus, the user of saw 10 can manually adjust the position of guide window 34 on shoe 20 by loosening bolt 66 and sliding guide window 34 along slot 36.

With specific reference to FIG. 7, in an alternative embodiment, guide window 34 is not installed on shoe 20. In this embodiment, shoe 20 has opening 48 extending therethrough. Guide marks 52, 54, 56 and 58 are located directly on shoe 20 and adjacent opening 48.

In use, saw 10 is placed against workpiece 32. Typically, workpiece 32 will have a reference line drawn thereon to indicate the desired cut-line. In order to align blade 14 with the desired cut-line, saw 10 is manipulated so that the reference line on workpiece 32 is located directly beneath marks 52 and 54. Marks 52 and 54 are used to align saw 10 when blade 14 is oriented in perpendicular relation to the top surface of workpiece 32. As best seen in FIG. 2, central opening 60 in guide window 34 allows the user of the saw to align the reference line with marks 52 and 54. As best seen in FIG. 3, if the reference line is not aligned with marks 52 and 54, any errors in alignment are visible through central opening 60. Thus, by utilizing guide window 34, the user of saw 10 is able to quickly and reliably ensure that blade 14 is properly oriented with respect to the desired cut-line.

Blade 14 on saw 10 may be rotated with respect to shoe 20, so that an angled cut is made through workpiece 32. This is achieved by loosening wing nut 30 on bolt 28 and rotating blade 14 relative to shoe 20 until the blade is at the desired cut angle. Thereafter, wing nut 30 is tightened about bolt 28 so that it abuts securely against bracket 24. If blade 14 is rotated to its extreme angled position, blade 14 will be at a 45 degree angle relative to shoe 20. In this orientation, marks 56 and 58 can be used to ensure that blade 14 is properly aligned with the reference line in a manner similar to that discussed above in relation to a perpendicular saw blade. Thus, guide window 34 can be used to ensure that blade 14 is properly aligned with the reference line when the blade is oriented to make a 45 degree cut through workpiece 32.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. A circular saw comprising:

a housing having a motor disposed therein;

a saw blade powered by said motor; a base having an aperture therethrough through which said saw blade protrudes, said base having a top surface and a generally planar bottom surface and a first edge located forwardly of said saw blade with respect to the direction of travel of said saw blade, a second edge in spaced relation opposite said first edge and opposing side edges extending between said first and second edges;

an opening extending through said base from said top surface to said bottom surface, said opening being located adjacent to said first edge and at least a portion of said opening being co-linear with the direction of travel of said saw blade; and a window assembly to said top surface of said base about said opening;

wherein said window has a first and a second set of guide marks thereon and adjacent said opening, said first set of guide marks indicating the direction of travel of said saw blade when said blade is oriented perpendicularly to said base bottom surface, said second set of guide marks indicating the direction of travel of said saw blade when said blade is oriented at a predetermined acute angle relative to said base bottom surface;

whereby a user of said saw can view a workpiece along the direction of travel of said saw blade through said opening.

2. The circular saw of claim 1, further comprising a covering coupled to said top surface about said opening, said covering being made of a clear material.

3. A circular saw comprising:

a housing having a motor disposed therein;

a saw blade powered by said motor;

a base having an aperture therethrough through which said saw blade protrudes, said base having a top surface and a generally planar bottom surface and a first edge located forwardly of said saw blade with respect to the direction of travel of said saw blade, a second edge in spaced relation opposite said first edge and opposing side edges extending between said first and second edges;

an opening extending through said base from said top surface to said bottom surface, said opening being located adjacent to said first edge and at least a portion of said opening being co-linear with the direction of travel of said saw blade; and a window assembly coupled to said top surface of said base about said opening, wherein said opening and said window assembly are generally rectangular and wherein said window assembly includes a front surface located adjacent said first edge and a rear surface located in parallel, spaced-apart relation to said front surface and parallel, spaced-apart side surfaces extending between said front surface and said rear surface, said front, rear and side surfaces forming a perimeter about said opening;

whereby a user of said saw can view a workpiece along the direction of travel of said saw blade through said opening.

4. The circular saw of claim 3, wherein said front surface and said rear surface have a first set of guide marks indicating the direction of travel of said saw blade when said blade is oriented perpendicular to said base bottom surface.

5. The circular saw of claim 4, wherein said front surface and said rear surface have a second set of guide marks thereon, said second set of guide marks indicating the direction of travel of said saw blade when the blade is oriented at a predetermined angle relative to said base bottom surface.

6. The circular saw of claim 4, further comprising adjusting means for adjusting the position of said window assembly along said first edge and between said opposing side edges, said adjusting means allowing said window assembly to be adjusted so that said guide marks are aligned with said saw blade when said saw blade is in the desired orientation.

7. The circular saw of claim 6, wherein said adjusting means includes a slotted throughhole that extends through one of said side surfaces and a relief slot extending into the opposite side surface such that the window assembly can be moved relative to said opposing side edges.

8. A circular saw comprising:

a housing a motor disposed therein;

a saw blade powered by said motor;

a base having an aperture therethrough through which said saw blade protrudes, said base having a top surface and a generally planer bottom surface and a first edge located forwardly of said saw blade with respect to the direction of travel of said saw blade, a second edge in spaced relation opposition said first edge and opposing side edges extending between said first and second edges;

an opening extending through said base from top surface to said bottom surface, said opening being located adjacent to said first edge and at least a portion of said opening being co-liner with the direction of travel of said saw blade;

a frame generally surrounding said opening and positioned on said top surface of said base;

a first set of guide marks on said frame indicating the direction of travel of said saw blade when said saw blade is oriented perpendicularly to said base bottom surface; and an adjusting means for adjusting the position of said frame along said base, said adjusting means allowing said frame to be adjusted so that said guide marks are aligned with said saw blade when said saw blade is in a desired orientation.

9. The circular saw of claim 8, wherein said frame has a second set of guide marks thereon, said second set of guide marks indicating the direction of travel of the saw blade when the blade is oriented at a predetermined acute angle relative to said bottom surface.

10. The circular saw of claim 9, further comprising a covering made of clear material coupled to said frame.

11. A circular saw comprising;

a housing having a motor disposed therein;

a saw blade powered by said motor;

a base having an aperture therethrough through which said saw blade protrudes, said base having a top surface and a generally planar bottom surface and a first edge located forwardly of said saw blade with respect to the direction of travel of said saw blade, a second edge in spaced relation opposite said first edge and opposing side edges extending between said first and second edges; and an opening extending through said base from said top surface to said bottom surface, said opening being located adjacent to said first edge and at least a portion of said opening being co-linear with the direction of travel of said saw blade;

wherein said base has a first and a second set of guide marks thereon and adjacent said opening, said first set of guide marks indicating the direction of travel of said saw blade when said blade is oriented perpendicularly to said base bottom surface, said second set of guide marks indicating the direction of travel of said saw blade when said blade is oriented at a predetermined acute angle relative to said base bottom surface;

whereby a user of said saw can view a workpiece along the direction of travel of said saw blade through said opening.

\* \* \* \* \*